(12) United States Patent
Liao

(10) Patent No.: US 11,265,173 B2
(45) Date of Patent: Mar. 1, 2022

(54) METHODS AND SYSTEMS FOR CONSENSUS IN BLOCKCHAINS

(71) Applicant: ALIPAY (HANGZHOU) INFORMATION TECHNOLOGY CO., LTD., Zhejiang (CN)

(72) Inventor: Xiaojun Liao, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/351,558

(22) Filed: Jun. 18, 2021

(65) Prior Publication Data

US 2021/0314167 A1 Oct. 7, 2021

(30) Foreign Application Priority Data

Jul. 3, 2020 (CN) .......................... 202010630033.X

(51) Int. Cl.
*H04L 29/06* (2006.01)
*H04L 9/32* (2006.01)

(52) U.S. Cl.
CPC .......... *H04L 9/3247* (2013.01); *H04L 9/3236* (2013.01); *H04L 63/123* (2013.01); *H04L 2209/38* (2013.01)

(58) Field of Classification Search
CPC .... H04L 9/3247; H04L 9/3236; H04L 63/123
See application file for complete search history.

(56) References Cited

U.S. PATENT DOCUMENTS

| | | |
|---|---|---|
| 10,102,265 B1 | 10/2018 | Madisetti et al. |
| 10,204,148 B2 | 2/2019 | Madisetti et al. |
| 10,250,708 B1 | 4/2019 | Carver et al. |
| 10,320,569 B1 | 6/2019 | Wentz et al. |
| 10,397,328 B2 | 8/2019 | Bohli et al. |
| 10,417,217 B2 * | 9/2019 | Pierce .................. G06F 8/65 |
| 10,761,877 B2 | 9/2020 | Peffers et al. |

(Continued)

FOREIGN PATENT DOCUMENTS

| | | |
|---|---|---|
| CN | 109379397 A | 2/2019 |
| CN | 110059494 A | 7/2019 |

(Continued)

OTHER PUBLICATIONS

First Search for Chinese Application No. 202010630033.X dated Aug. 6, 2020.

(Continued)

*Primary Examiner* — Ghodrat Jamshidi

(57) ABSTRACT

This specification discloses a method and a system. The method includes: obtaining a Merkle root of one or more proposals initiated by one or more nodes associated with a blockchain; signing the Merkle root of the one or more proposals to obtain a digital signature of the one or more proposals; transmitting the digital signature of the one or more proposals to one or more nodes associated with the blockchain; receiving one or more digital signatures of the one or more proposals from one or more nodes associated with the blockchain respectively; determining that a quantity of the received one or more digital signatures is at least 2 f+1, wherein f is a maximum quantity of abnormal nodes permitted by the blockchain; and generating a proof of consensus for the one or more proposals based on the received one or more digital signatures.

17 Claims, 3 Drawing Sheets

(56) References Cited

U.S. PATENT DOCUMENTS

| | | |
|---|---|---|
| 10,791,107 B2 | 9/2020 | Lin |
| 10,938,567 B2 | 3/2021 | Martino et al. |
| 2017/0344435 A1* | 11/2017 | Davis .................. G06F 16/9535 |
| 2018/0247191 A1 | 8/2018 | Katz et al. |
| 2019/0058581 A1 | 2/2019 | Wood et al. |
| 2019/0075022 A1 | 3/2019 | Anderson et al. |
| 2019/0147438 A1* | 5/2019 | Micali .................. H04L 9/3239 705/71 |
| 2019/0188706 A1* | 6/2019 | McCurtis ............... G06Q 20/02 |
| 2019/0286531 A1 | 9/2019 | Lin |
| 2019/0339668 A1 | 11/2019 | Biernat et al. |
| 2019/0349733 A1 | 11/2019 | Nolan et al. |
| 2020/0057994 A1 | 2/2020 | Hunn |
| 2020/0162261 A1* | 5/2020 | Iyer ...................... H04L 9/3236 |
| 2020/0162264 A1 | 5/2020 | Zamani et al. |
| 2020/0195444 A1 | 6/2020 | Lin |
| 2020/0356991 A1* | 11/2020 | Saraniecki ............ H04L 9/0637 |
| 2020/0389291 A1* | 12/2020 | Xiao ..................... H04L 9/0637 |
| 2021/0109825 A1 | 4/2021 | Liao |
| 2021/0245441 A1* | 8/2021 | Lima ...................... B33Y 50/02 |
| 2021/0273807 A1* | 9/2021 | Wertheim ............. H04L 9/3221 |

FOREIGN PATENT DOCUMENTS

| | | |
|---|---|---|
| CN | 110572287 A | 12/2019 |
| CN | 110798308 A | 2/2020 |

OTHER PUBLICATIONS

Supplementary Search for Chinese Application No. 202010630033.X dated Aug. 28, 2020.

Extended European Search Report for European Application No. 21 181 496.7 dated Nov. 25, 2021.

Miller et al., "The Honey Badger of BFT Protocols," Computer And Communications Security, ACM, Oct. 24, 2016.

Castro et al., "Practical Byzantine fault tolerance and proactive recovery," ACM Transactions on Computer Systems (TOCS), Association for Computing Machinery, Inc, US, vol. 20, No. 4, Nov. 1, 2002.

Androulaki et al., "Hyperledger Fabric: A Distributed Operating System for Permissioned Blockchains," EUROSYS '18: Proceedings of the Thirteenth Eurosys Conference, Jan. 1, 2018.

\* cited by examiner

METHODS AND SYSTEMS FOR CONSENSUS IN BLOCKCHAINS

CROSS-REFERENCE TO RELATED APPLICATIONS

This application is based upon and claims priority to and benefits of Chinese Patent Application No. 202010630033.X, filed on Jul. 3, 2020. The content of the above identified application is incorporated herein by reference in its entirety.

TECHNICAL FIELD

This file relates to the field of computer technologies, and in particular, to a method and a system for consensus in a blockchain.

BACKGROUND

Practical Byzantine fault tolerance (PBFT) algorithm is a consensus algorithm widely used in scenarios of blockchains such as a consortium blockchain. The PBFT mainly reaches consensus on a newly generated block through message interactions of three phases of pre-prepare, prepare, and commit.

In a scenario of a blockchain such as a consortium blockchain or a blockchain of other types, generation of a block generally requires consensus nodes to reach consensus. However, in a consensus protocol of a consensus algorithm such as the PBFT or a RAFT, there is no valid proof for a proposal set recorded in a block generated after consensus, that is, no proof on whether the proposal set is acknowledged by most consensus nodes.

SUMMARY

Embodiments of this specification provide a method and a system for consensus in a blockchain, proofs of consensus for all proposals on which consensus is reached are generated based on signatures of a Merkle root of all the proposals on which consensus is reached that are signed by nodes participating in consensus in a blockchain, thereby improving the efficiency of proving the validity of a block recording all the proposals on which consensus is reached.

To resolve the foregoing technical problem, the embodiments of this specification are implemented as follows.

According to a first aspect, a method for consensus in a blockchain is provided, including:

obtaining, by a first consensus node in a blockchain, a Merkle root of one or more proposals on which consensus is reached, where the one or more proposals on which consensus is reached are initiated by one or more consensus nodes in the blockchain;

signing, by the first consensus node, the Merkle root of the one or more proposals on which consensus is reached, to obtain a signature of the one or more proposals on which consensus is reached;

transmitting, by the first consensus node, the signature of the one or more proposals on which consensus is reached to one or more consensus nodes in the blockchain;

receiving, by a second consensus node in the blockchain, the signature transmitted by the first consensus node; and if the second consensus node receives signatures transmitted by 2 f+1 first consensus nodes, generating, by the second consensus node based on the received signatures, a proof of consensus for the one or more proposals on which consensus is reached, where f is a maximum quantity of abnormal consensus nodes permitted by the blockchain.

In an embodiment, a method comprises: obtaining a Merkle root of one or more proposals initiated by one or more nodes associated with a blockchain; signing the Merkle root of the one or more proposals to obtain a digital signature of the one or more proposals; transmitting the digital signature of the one or more proposals to one or more nodes associated with the blockchain; receiving one or more digital signatures of the one or more proposals from one or more nodes associated with the blockchain respectively; determining that a quantity of the received one or more digital signatures is at least 2 f+1, wherein f is a maximum quantity of abnormal nodes permitted by the blockchain; and generating a proof of consensus for the one or more proposals based on the received one or more digital signatures.

In an embodiment, the one or more proposals comprise a plurality of proposals, and the obtaining a Merkle root of one or more proposals comprises: generating a Merkle tree based on the plurality of proposals; and obtaining a Merkle root of the plurality of proposals based on the generated Merkle tree.

In an embodiment, the generating a Merkle tree based on the plurality of proposals comprises: obtaining a sequence of a plurality of nodes initiating the plurality of proposals; sequentially obtaining, according to the sequence of the plurality of nodes, transactions included in the plurality of proposals; and generating the Merkle tree based on the sequence of the plurality of nodes and the transactions included in the plurality of proposals.

In an embodiment, the generating a proof of consensus for the one or more proposals based on the received one or more digital signatures comprises: verifying the received one or more digital signatures; and generating the proof of consensus for the one or more proposals based on the verified one or more digital signatures.

In an embodiment, after generating the proof of consensus for the one or more proposals, the method further comprises: obtaining a transaction set based on transactions included in the one or more proposals; and generating a new block recording the transaction set.

In an embodiment, before obtaining a Merkle root of one or more proposals, the method further comprises: splitting a proposal on which consensus is pending into a plurality of data blocks through erasure coding, wherein a quantity of the plurality of data blocks is the same as a quantity of nodes associated with the blockchain; constructing a Merkle tree based on hash values of the plurality of data blocks, to obtain a corresponding Merkle path and a corresponding root hash; storing one or more data blocks of the plurality of data blocks locally, and transmitting, to a plurality of nodes associated with the blockchain, the other data blocks of the plurality of data blocks, Merkle proofs of the other data blocks on the Merkle path, and the root hash, for the plurality of nodes in the blockchain to perform consensus processing and feedback on the transmitted data blocks; and receiving a plurality of proposals on which consensus is pending that are initiated by one or more of the plurality of consensus nodes associated with the blockchain, and performing consensus processing and feedback respectively on the plurality of proposals on which consensus is pending.

In an embodiment, the performing consensus processing and feedback respectively on the plurality of proposals on which consensus is pending comprises: performing, based on a binary agreement (BA) sub-protocol in a Honey Badger Byzantine fault tolerance (BFT) consensus algorithm, consensus processing and feedback respectively on the plurality of proposals on which consensus is pending.

In an embodiment, the verifying the received one or more digital signatures comprises: performing signature verification on the received one or more digital signatures based on a locally stored Merkle root of the one or more proposals.

In an embodiment, the blockchain uses a consensus protocol of a BFT algorithm, the one or more proposals consists of one proposal, and the one proposal is initiated by a consensus master node associated with the blockchain.

According to a second aspect, a blockchain-based system is provided, including:

a first consensus node in a blockchain, configured to: obtain a Merkle root of one or more proposals on which consensus is reached, where the one or more proposals on which consensus is reached are initiated by one or more consensus nodes in the blockchain; sign the Merkle root of the one or more proposals on which consensus is reached, to obtain a signature of the one or more proposals on which consensus is reached; and transmit the signature of the one or more proposals on which consensus is reached to one or more consensus nodes in the blockchain; and a second consensus node in the blockchain, configured to: receive the signature transmitted by the first consensus node; and if signatures transmitted by 2 f+1 first consensus nodes are received, generate, based on the received signatures, a proof of consensus for the one or more proposals on which consensus is reached, where f is a maximum quantity of abnormal consensus nodes permitted by the blockchain.

In an embodiment, a system comprises one or more processors and a non-transitory computer-readable storage medium storing instructions executable by the one or more processors to cause the system to perform operations. The operations comprises: obtaining a Merkle root of one or more proposals initiated by one or more nodes associated with a blockchain; signing the Merkle root of the one or more proposals to obtain a digital signature of the one or more proposals; transmitting the digital signature of the one or more proposals to one or more nodes associated with the blockchain; receiving one or more digital signatures of the one or more proposals from one or more nodes associated with the blockchain respectively; determining that a quantity of the received one or more digital signatures is at least 2 f+1, wherein f is a maximum quantity of abnormal nodes permitted by the blockchain; and generating a proof of consensus for the one or more proposals based on the received one or more digital signatures.

According to a third aspect, a non-transitory computer-readable storage medium is provided. The non-transitory computer-readable storage medium is configured with instructions executable by one or more processors to cause the one or more processors to perform operations. The operations comprises: obtaining a Merkle root of one or more proposals initiated by one or more nodes associated with a blockchain; signing the Merkle root of the one or more proposals to obtain a digital signature of the one or more proposals; transmitting the digital signature of the one or more proposals to one or more nodes associated with the blockchain; receiving one or more digital signatures of the one or more proposals from one or more nodes associated with the blockchain respectively; determining that a quantity of the received one or more digital signatures is at least 2 f+1, wherein f is a maximum quantity of abnormal nodes permitted by the blockchain; and generating a proof of consensus for the one or more proposals based on the received one or more digital signatures.

The embodiments of this specification may at least achieve the following technical effects by using the foregoing technical solutions.

When a proof of consensus is generated for one or more proposals on which consensus is reached, a first consensus node in a blockchain can obtain a Merkle root of the one or more proposals on which consensus is reached, where the one or more proposals on which consensus is reached are initiated by one or more consensus nodes in the blockchain; sign the Merkle root of the one or more proposals on which consensus is reached, to obtain a signature of the one or more proposals on which consensus is reached; and then transmit the signature of the one or more proposals on which consensus is reached to one or more consensus nodes in the blockchain. A second consensus node in the blockchain can receive the signature transmitted by the first consensus node, and if signatures transmitted by 2 f+1 first consensus nodes are received, the second consensus node generates, based on the received signatures, a proof of consensus for the one or more proposals on which consensus is reached, where f is a maximum quantity of abnormal consensus nodes permitted by the blockchain. In this way, after the second consensus node generates proofs of consensus of all proposals on which consensus is reached, the validity of a block recording all the proposals on which consensus is reached can be confirmed based on the proofs of consensus, thereby greatly improving the efficiency of proving the validity of the block.

BRIEF DESCRIPTION OF THE DRAWINGS

Accompanying drawings described herein are used for providing further understanding about this specification, and constitute a part of this specification. Embodiments of this specification and descriptions thereof are used for explaining this specification, and do not constitute limitations on this specification. In the accompanying drawings.

DETAILED DESCRIPTION

To make the objectives, technical solutions, and advantages of this document clearer, the technical solutions of this specification will be clearly and completely described below with reference to specific embodiments of this specification and corresponding accompanying drawings. The described embodiments are merely some but not all of the embodiments of this document. All other embodiments obtained by a person of ordinary skill in the art based on the embodiments of this specification without creative efforts shall fall within the protection scope of this document.

The technical solutions provided in the embodiments of this specification are described in detail below with reference to the accompanying drawings.

To resolve an existing problem that there is no valid proof for a proposal set recorded in a block generated after consensus and that makes it difficult to improve the efficiency of proving the validity of the block, an embodiment of this specification provides a method for consensus in a blockchain. By using the method for consensus in a blockchain provided in this embodiment of this specification, when a proof of consensus is generated for one or more proposals on which consensus is reached, a first consensus node in a blockchain can obtain a Merkle root of the one or more proposals on which consensus is reached, where the one or more proposals on which consensus is reached are initiated by one or more consensus nodes in the blockchain; sign the Merkle root of the one or more proposals on which consensus is reached, to obtain a signature (e.g., a digital signature) of the one or more proposals on which consensus is reached; and then transmit the signature of the one or more proposals on which consensus is reached to one or more consensus nodes in the blockchain.

A second consensus node in the blockchain can receive the signature transmitted by the first consensus node, and if signatures transmitted by 2 f+1 first consensus nodes are received, the second consensus node may generate, based on the received signatures, a proof of consensus for the one or more proposals on which consensus is reached, where f is a maximum quantity of abnormal consensus nodes permitted by the blockchain. In this way, after the second consensus node generates proofs of consensus for all proposals on which consensus is reached, the validity of a block recording all the proposals on which consensus is reached can be confirmed based on the proofs of consensus, thereby greatly improving the efficiency of proving the validity of the block.

Figure 1:
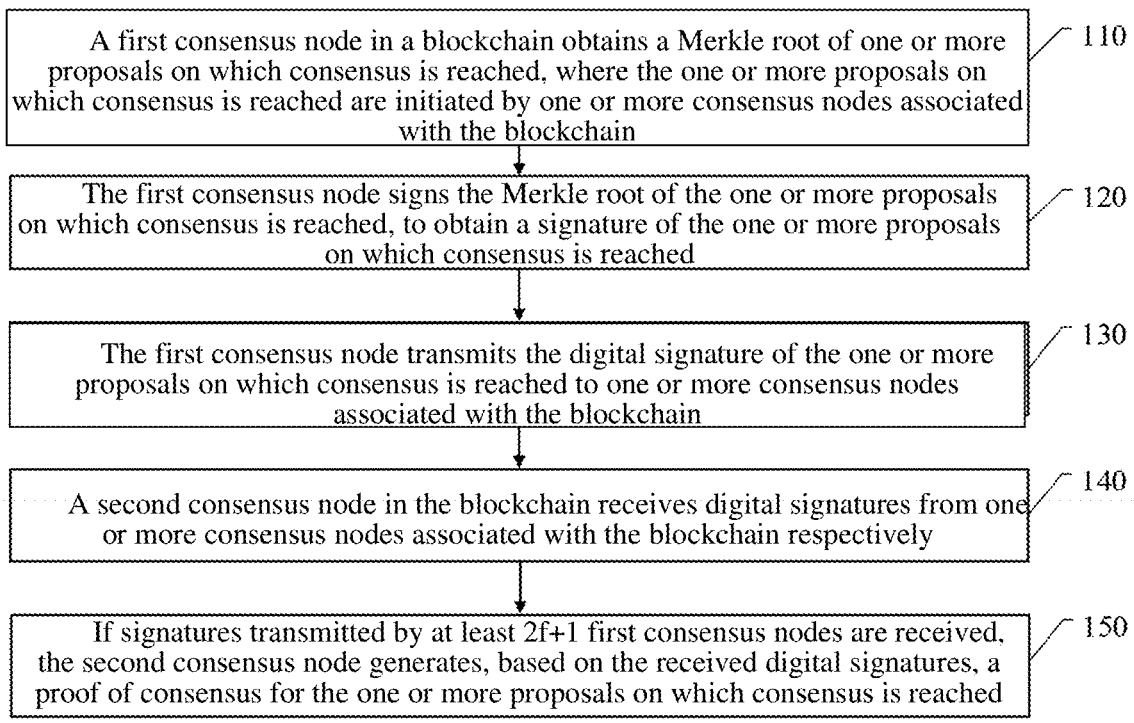
FIG. 1 is a schematic flowchart of a method for consensus in a blockchain, according to an embodiment of this specification.

FIG. 1 is a schematic flowchart of a method for consensus in a blockchain, according to one or more embodiments of this specification. The method is applicable to one or more consensus nodes in a blockchain, and includes the following steps.

Step 110: A first consensus node in a blockchain obtains a Merkle root of one or more proposals on which consensus is reached, where the one or more proposals on which consensus is reached are initiated by one or more consensus nodes associated with the blockchain.

The first consensus node may be any consensus node in the blockchain. Any consensus node in the blockchain may be used as the first consensus node to transmit a signature (e.g., a digital signature) to other consensus nodes.

When a blockchain uses a PBFT consensus protocol, there is only one proposal on which consensus is reached. In this case, the obtaining, by a first consensus node in a blockchain, a Merkle root of one or more proposals on which consensus is reached may be obtaining a hash value of the proposal on which consensus is reached, where the proposal on which consensus is reached is initiated by a consensus master node in the blockchain.

In an embodiment, when the blockchain uses a consensus protocol of a Honey Badger BFT algorithm, there are a plurality of proposals on which consensus is reached, and the plurality of proposals are initiated by a plurality of consensus nodes in the blockchain; and the obtaining, by a first consensus node in a blockchain, a Merkle root of one or more proposals on which consensus is reached includes:

generating, by the first consensus node, a Merkle tree based on the plurality of proposals on which consensus is reached; and obtaining, by the first consensus node, a Merkle root of the plurality of proposals on which consensus is reached based on the generated Merkle tree.

In an embodiment, to facilitate calculation of the Merkle root of the plurality of proposals on which consensus is reached, in this embodiment of this specification, the Merkle tree of the plurality of proposals may be generated based on a sequence of the consensus nodes initiating the plurality of proposals on which consensus is reached. The generating, by the first consensus node, a Merkle tree based on the plurality of proposals on which consensus is reached includes:

obtaining, by the first consensus node, a sequence of the plurality of consensus nodes initiating the plurality of proposals on which consensus is reached;

sequentially obtaining, by the first consensus node according to the sequence of the plurality of consensus nodes, transactions included in the plurality of proposals on which consensus is reached; and generating, by the first consensus node, the Merkle tree based on the sequence of the plurality of consensus nodes and the transactions included in the plurality of proposals on which consensus is reached.

A proposal on which consensus is reached may include transactions obtained from a node transaction pool by a node that initiates the proposal or may be empty, that is, the proposal does not include transactions obtained from a node transaction pool by the node that initiates the proposal.

When the blockchain uses the consensus protocol of the Honey Badger BFT algorithm, assuming that there are four nodes participating in consensus in the blockchain, which are respectively a consensus node A to a consensus node D, transactions included in a proposal of the consensus node A are Atx1, Atx2, and Atx3, transactions included in a proposal of the consensus node B are Btx1, Btx2, and Btx3, transactions included in a proposal of the consensus node C are Ctx1 and Ctx2, and a transaction included in a proposal of the consensus node D is Dtx1. It is assumed that consensus results (0 or 1, where 0 indicates that consensus is not reached, and 1 indicates that consensus is reached) of the proposals of the consensus node A to the consensus node D are as follows:

the consensus node A: Atx1, Atx2, Atx3, and a consensus result is 1;

the consensus node B: Btx1, Btx2, Btx3, and a consensus result is 1;

the consensus node C: Ctx1, Ctx2, and a consensus result is 1; and the consensus node D: Dtx1, and a consensus result is 0.

It is assumed that a sequence of the four consensus nodes, namely, the consensus node A to the consensus node D, is ABCD. After consensus on the proposals of the consensus node A to the consensus node D is finished, according to the sequence of the consensus nodes, if a consensus result of a consensus node is 1, the proposal is selected. In this way, a final transaction set of proposals on which consensus is reached is {Atx1, Atx2, Atx3, Btx1, Btx2, Btx3, Ctx1, Ctx2}. In this case, the generating, by the first consensus node, a Merkle tree based on the plurality of proposals on which consensus is reached may be: first obtaining hash values of the transactions in the transaction set; and then generating the Merkle tree based on the hash values of the transactions in the transaction set, to obtain the Merkle root of the plurality of proposals on which consensus is reached based on the generated Merkle tree.

After the second consensus node generates, based on the received signatures (e.g., digital signatures), the proofs of consensus of the proposals on which consensus is reached, to store transaction sets included in the proposals on which consensus is reached, in this embodiment of this specification, a new block recording the transaction sets may be generated, and the proofs of consensus of the proposals on which consensus is reached are recorded in the new block. The method provided in this embodiment of this specification further includes:

obtaining a transaction set based on transactions included in the proposals on which consensus is reached; and generating a new block recording the transaction set.

In an embodiment, to verify the validity of a proposal on which consensus is pending and which is broadcasted into the blockchain, before the obtaining, by a first consensus node in the blockchain, a Merkle root of a proposal on which consensus is reached, the proposal on which consensus is pending may be further split into a plurality of data blocks. A Merkle tree is constructed based on the plurality of data blocks. Only for some of the data blocks, Merkle proofs of the some of the data blocks on a Merkle path of the Merkle tree, and a root hash are transmitted, for nodes receiving these messages to verify the validity of the messages based on the received messages. Before the obtaining, by a first consensus node in a blockchain, a Merkle root of a proposal on which consensus is reached, the method provided in this embodiment of this specification further includes:

splitting, by the first consensus node, a proposal on which consensus is pending into a plurality of data blocks through erasure coding, where a quantity of the plurality of data blocks is the same as a quantity of consensus nodes in the blockchain;

constructing, by the first consensus node, a Merkle tree based on hash values of the plurality of data blocks, to obtain a corresponding Merkle path and a corresponding root hash;

storing, by the first consensus node, some of data blocks of the plurality of data blocks locally, and transmitting other data blocks of the plurality of data blocks, Merkle proofs of the other data blocks on the Merkle path, and the root hash to other consensus nodes in the blockchain, for the other consensus nodes in the blockchain to perform consensus processing and feedback on the received data blocks; and receiving, by the first consensus node, a plurality of proposals on which consensus is pending that are initiated by the other consensus nodes in the blockchain, and performing consensus processing and feedback respectively on the plurality of proposals on which consensus is pending.

The first data block in the plurality of data blocks may be stored locally, and a jth data block in the plurality of data blocks, a Merkle proof of the jth data block on a Merkle path, and the root hash are transmitted to a jth consensus node, for the jth consensus node to verify, after receiving the information, the validity of a received proposal based on the jth data block, the Merkle proof of the jth data block on the Merkle path, and the root hash. If a root hash obtained based on the jth data block and the Merkle proof of the jth data block on the Merkle path is the same as the received root hash, it indicates that the received information is valid. Otherwise, the received information is invalid and is discarded.

In an embodiment, when the blockchain uses the consensus protocol of the Honey Badger BFT algorithm, the performing, by the first consensus node, consensus processing and feedback respectively on the plurality of proposals on which consensus is pending includes:

performing, based on a binary agreement (BA) subprotocol in the Honey Badger BFT consensus algorithm, consensus processing and feedback respectively on the plurality of proposals on which consensus is pending.

Step 120: The first consensus node signs the Merkle root of the one or more proposals on which consensus is reached, to obtain a signature (e.g., a digital signature) of the one or more proposals on which consensus is reached.

To improve a security level of the Merkle root of the one or more proposals on which consensus is reached, before the consensus node broadcasts the Merkle root of the one or more proposals on which consensus is reached in the blockchain, one public key pk and N private keys sk may be generated in the blockchain. Each consensus node in the blockchain has a private key sk and the public key pk, the consensus node uses its own private key to sign a Merkle root of all proposals on which consensus is reached and broadcasts a signature to other consensus nodes in the blockchain.

An example in which nodes participating in consensus in the blockchain include the consensus node A to the consensus node D is used. After the consensus node A to the consensus node D respectively obtain a Merkle root of a plurality of proposals on which consensus is reached, the consensus node A uses its own private key skA to sign the Merkle root of the plurality of proposals on which consensus is reached to obtain a sigA, the consensus node B uses its own private key skB to sign the Merkle root of the plurality of proposals on which consensus is reached to obtain a sigB, the consensus node C uses its own private key skC to sign the Merkle root of the plurality of proposals on which consensus is reached to obtain a sigC, and the consensus node D uses its own private key skD to sign the Merkle root of the plurality of proposals on which consensus is reached to obtain a sigD.

Step 130: The first consensus node transmits the digital signature of the one or more proposals on which consensus is reached to one or more consensus nodes associated with the blockchain.

The consensus node A broadcasts the signature sigA to nodes in the blockchain, for the consensus node B to the consensus node D to verify the signature sigA, the consensus node B broadcasts the signature sigB to consensus nodes in the blockchain, for the consensus node A, the consensus node C, and the consensus node D to verify the signature sigB, the consensus node C broadcasts the signature sigC to consensus nodes in the blockchain, for the consensus node A, the consensus node B, and the consensus node D to verify the signature sigC, and the consensus node D broadcasts the signature sigD to nodes in the blockchain, for the consensus node A, the consensus node B, and the consensus node C to verify the signature sigD.

Step 140: A second consensus node in the blockchain receives digital signatures from one or more consensus nodes associated with the blockchain respectively.

In an embodiment, the second consensus node may be any consensus node receiving the signature transmitted by the first consensus node. Any consensus node in the blockchain may be used as the first consensus node to transmit a signature to other consensus nodes and may also be used as the second consensus node to receive signatures from other consensus nodes. As such, one or more digital signatures of the one or more proposals are respectively received from one or more nodes associated with the blockchain. Before the receiving, by a second consensus node in the blockchain, the signature transmitted by the first consensus node, the method further includes:

obtaining, by the second consensus node, a Merkle root of one or more proposals on which consensus is reached, where the one or more proposals on which consensus is reached are initiated by one or more consensus nodes in the blockchain;

signing, by the second consensus node, the Merkle root of the one or more proposals on which consensus is reached, to obtain a signature of the one or more proposals on which consensus is reached; and transmitting, by the second consensus node, the signature of the one or more proposals on which consensus is reached to one or more consensus nodes in the blockchain.

Step 150: If signatures transmitted by at least 2 f+1 first consensus nodes are received, the second consensus node generates, based on the received digital signatures, a proof of consensus for the one or more proposals on which consensus is reached, where f is a maximum quantity of abnormal consensus nodes permitted by the blockchain.

After receiving signatures from consensus nodes in the blockchain, a consensus node in the blockchain first caches the received signatures, and after determining that x signature messages are received (wherein 2 f+1≤x≤N), signature verification is performed by using a Merkle root stored by the consensus node and the x signatures. If there are at least 2 f+1 valid signatures, a proof of consensus for the proposals on which consensus is reached is generated based on the at least 2 f+1 verified/valid signatures. Wherein, x is a quantity of signatures received by the consensus node, and N is a quantity of all nodes participating in consensus in the blockchain.

In an embodiment, to improve the efficiency of verifying the validity of all proposals on which consensus is reached, in this embodiment of this specification, proofs of consensus of all the proposals on which consensus is reached may be generated based on signatures of which the quantity is at least 2 f+1 and that are received from the consensus nodes in the blockchain. The generating, by the second consensus node based on the received signatures if signatures transmitted by 2 f+1 first consensus nodes are received, a proof of consensus for the one or more proposals on which consensus is reached includes:

if the signatures transmitted by the 2 f+1 first consensus nodes are received, verifying, by the second consensus node, the received signatures; and if the received signatures are verified, generating, by the second consensus node based on the verified signatures, the proof of consensus for the one or more proposals on which consensus is reached.

In an embodiment, to improve the reliability of the proof of consensus, before the second consensus node generates the proof of consensus, the second consensus node of this embodiment of this specification may verify the received signatures. The verifying, by the second consensus node, the received signatures includes:

performing, by the second consensus node, signature verification on the received signatures based on a locally stored Merkle root of the one or more proposals on which consensus is reached.

To improve the reliability of the generated proof of consensus, after receiving a signature, the second consensus node may use the public key stored locally to decrypt the signature, to obtain a to-be-verified Merkle root. If the to-be-verified Merkle root is the same as the Merkle root that is locally calculated by the second consensus node and that is of the one or more proposals on which consensus is reached, it indicates that the signature is valid/verified.

When the blockchain uses a consensus protocol of a BFT algorithm, the proposal on which consensus is reached is initiated by a consensus master node in the blockchain, and there is one proposal on which consensus is reached.

Figure 2:
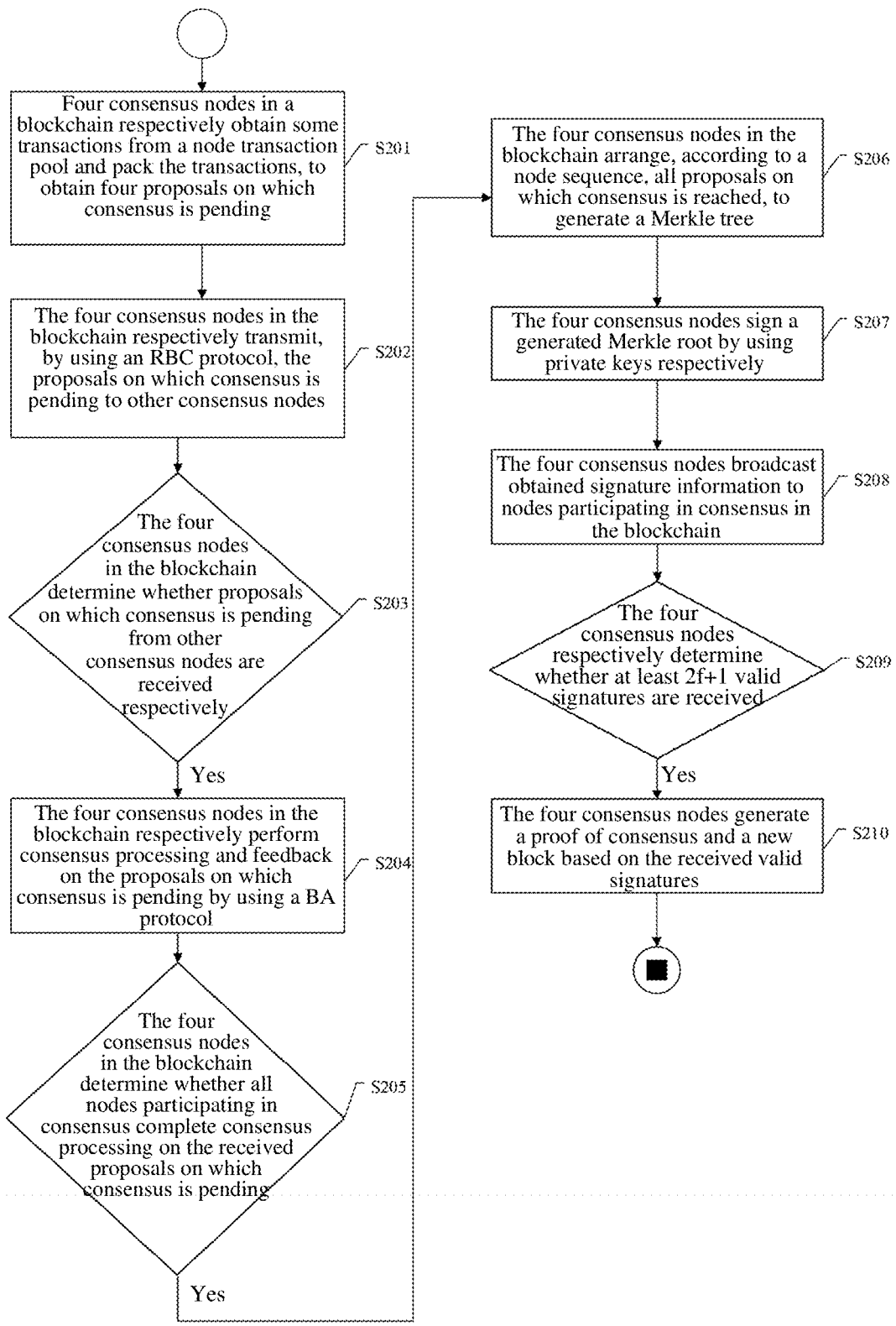
FIG. 2 is a schematic diagram of a method for consensus in a blockchain applicable to an actual scenario, according to an embodiment of this specification.

A consensus node execution procedure of a blockchain using a consensus protocol of a Honey Badger BFT algorithm shown in FIG. 2 is used as an example to describe below in detail the method for consensus in a blockchain provided in this embodiment of this specification. As shown in FIG. 2, a schematic flowchart of a method is applicable to a blockchain that includes a plurality of consensus nodes. Using the blockchain including four consensus nodes (a consensus node A to a consensus node D) as an example, the method includes the following steps.

S201: The four consensus nodes in the blockchain respectively obtain some transactions from a node transaction pool and respectively pack the transactions, to obtain four proposals on which consensus is pending.

The consensus node A obtains transactions Atx1, Atx2, and Atx3 from the node transaction pool and packs the transactions Atx1, Atx2, and Atx3 into a message ma as a proposal of the consensus node A. The consensus node B obtains transactions Btx1, Btx2, and Btx3 from the node transaction pool and packs the transactions Btx1, Btx2, and Btx3 into a message mb as a proposal of the consensus node B. The consensus node C obtains transactions Ctx1 and Ctx2 from the node transaction pool and packs the transactions Ctx1 and Ctx2 into a message mc as a proposal of the consensus node C. The consensus node D obtains a transaction Dtx1 from the node transaction pool and packs the transaction Dtx1 into a message md as a proposal of the consensus node D.

S202: The four consensus nodes in the blockchain respectively transmit, by using an RBC protocol, the proposals on which consensus is pending to other consensus nodes.

The consensus node A transmits the proposal ma on which consensus is pending to the consensus nodes B, C, and D by using the RBC protocol. The consensus node B transmits the proposal mb on which consensus is pending to the consensus nodes A, C, and D by using the RBC protocol. The consensus node C transmits the proposal mc on which consensus is pending to the consensus nodes A, B, and D by using the RBC protocol. The consensus node D transmits the proposal md on which consensus is pending to the consensus nodes A, B, and C by using the RBC protocol.

A specific process of the consensus node A transmitting the proposal ma on which consensus is pending to the consensus nodes B, C, and D by using the RBC protocol is as follows:

The consensus node A first splits the message ma into N data blocks through erasure coding, and it is assumed that the data blocks are four data blocks, that is, block00 to block03.

The consensus node A then constructs a Merkle tree based on hash values (Hash000 to Hash003) of the split four data blocks (block00 to block03). A first leaf node is the hash value Hash000 of block00, a second leaf node is the hash value Hash001 of block01, . . . , and a fourth leaf node is the hash value Hash003 of block03. A quadratic hash value of the hash value Hash000 and the hash value Hash001 is Hash00, a quadratic hash value of the hash value Hash002 and the hash value Hash003 is Hash01, and a quadratic hash value of Hash00 and Hash01 is Hash0 (that is, a Merkle root).

Finally, the consensus node A stores block00 locally, transmits (block01 and Hash000, Hash01, and Hash0) to the consensus node B, transmits (block02 and Hash003, Hash00, and Hash0) to Node C, and transmits (block03 and Hash002, Hash00, and Hash0) to the consensus node D.

The message (block01 and Hash000, Hash01, Hash0) is recorded as Rval (h, bj, sj), where h is a root hash, bj is a jth data block, and sj is a Merkle proof of the jth data block on a corresponding Merkle path.

After the message Rval (h, bj, sj) is received by another consensus node, received (h, bj, sj) is broadcasted to other nodes through an Echo message, and a message format is Echo (h, bj, sj), and for the received Echo message, each consensus node j checks whether the message is valid, and discards the message if the message is invalid.

For example, the consensus node B calculates Hash001 of received block01, calculates Hash00 by using calculated Hash001 and received Hash000, calculates Hash0 by using calculated Hash00 and received Hash01, and compares calculated Hash0 with received Hash0. If the two values are the same, the message is valid, or otherwise, Echo (h, bj, sj) is discarded.

Similarly, verification is performed on all received (h, bj, sj), and a message is discarded if the message is invalid.

For each node, after receiving N-f Echo messages (added by messages that are stored locally before) from different nodes, N-2 f data blocks are selected to restore the messages, and a Merkle tree is reconstructed. Whether a root of the reconstructed Merkle tree and the previous root are the same is verified. If the two roots are different, the messages are discarded, and if the two roots are the same, a Ready message is broadcasted, and message content is stored.

Manners in which the consensus node B to the consensus node D transmit the proposals on which consensus is pending to the other consensus nodes are similar to the foregoing process, and details are not described herein again.

S203: The four consensus nodes in the blockchain respectively determine whether proposals on which consensus is pending from other consensus nodes are received, and if yes, perform S204.

S204: The four consensus nodes in the blockchain respectively perform consensus processing and feedback on the proposals on which consensus is pending by using a BA protocol.

i: For each node participating in consensus in the blockchain, the BA is initialized, and r is initialized to 0 in a first round and is increased progressively in each subsequent round, and est is initialized by using an input.

ii: For each node participating in consensus in the blockchain, an opinion of the consensus node on a proposal is broadcasted, and est is transmitted by using a Bval message, where a message format is Bvalr (estr).

iii: For each node participating in consensus in the blockchain, when the node receives f+1 or more same estr values (an opinion of the node itself is not included) from different consensus nodes, if the node has not broadcasted the estr value, the node broadcasts a Bvalr (estr), and the estr value broadcasted this time is different from the estr value broadcasted the first time, to correct the opinion of the node.

iv: When the node receives 2 f+1 or more same estr values (including a current opinion of the node itself) from different consensus nodes, the estr values are stored into a set {bin_valuesr}. The set {bin_valuesr} may have four states, which are respectively: Ø, {0}, {1}, and {0, 1}, where the last three states are final states.

v: When the set {bin_valuesr} is not empty (a value that is put into the set first causes the set to be not empty), the value is used as an input of a next phase, and the next phase starts. Meanwhile, the current phase may also continue to proceed, to continue to add values into {bin_valuesr}.

vii: When the set {bin_valuesr} is not empty, a consensus node takes a value W out of the set {bin_valuesr} and broadcasts the value to other consensus nodes, where a broadcasted message is an Aux message, and a message format is Auxr (W).

viii: The consensus node receives Aux messages transmitted from other consensus nodes, and stores the value W therein into a local set valuesr (different from the set {bin_valuesr}) until the following two conditions are met:

condition 1: values in valuesr need to exist in the {bin_valuesr}, which may ensure that the values in valuesr are broadcasted by non-abnormal consensus nodes; and condition 2: Auxr messages transmitted by at least N-f different consensus nodes are received.

ix: The consensus node makes a decision through coin tossing, a coin tossing process is a result of performing a modulo operation on 2 by using a common factor sr that is the same in various consensus nodes and related to r (that is, sr %2, and sr may be a value of current r). A result of the coin tossing may be 0 or 1, and there are the following two branches:

branch 1: if valuesr only has one value v (0 or 1), when v is equal to s r %2, v is an output of the BA protocol; when v is not equal to sr %2, a next round of consensus is entered, in this case, r is added by 1 (that is, r=r+1), and an initial value estr of the next round is set to be equal to v; and branch 2: if valuesr includes two values {0, 1}, the consensus node does not make a final decision, and directly enters the next round of consensus, r is added by 1 (that is, r=r+1), and the initial value estr of the next round is set to be equal to sr %2.

S205: The four consensus nodes in the blockchain determine whether all nodes participating in consensus complete consensus processing on the received proposals on which consensus is pending. If yes, proceed to S206.

S206: The four consensus nodes in the blockchain arrange, according to a node sequence, all proposals on which consensus is reached, to generate a Merkle tree.

It is assumed that the proposals on which consensus is reached are ma to mc and a node sequence is the consensus node A to the consensus node C sequentially. Transactions in ma to mc may be taken out sequentially according to the node sequence, that is, the eight transactions Atx1, Atx2, Atx3, Btx1, Btx2, Btx3, Ctx1, and Ctx2. A Merkle tree is generated based on the eight transactions to obtain a Merkle root of the eight transactions, that is, a Merkle root of all the proposals on which consensus is reached.

S207: The consensus node A to the consensus node D sign a Merkle root of the generated Merkle tree by using private keys of the consensus nodes respectively, to obtain signatures of the Merkle root of all the proposals on which consensus is reached.

In an optimal state, a signature of the consensus node A for the Merkle root of all the proposals on which consensus is reached, a signature of the consensus node B for the Merkle root of all the proposals on which consensus is reached, a signature of the consensus node C for the Merkle root of all the proposals on which consensus is reached, and a signature of the consensus node D for the Merkle root of all the proposals on which consensus is reached may be obtained.

S208: The consensus node A to the consensus node D broadcast the signatures of the Merkle root of all the proposals on which consensus is reached to nodes participating in consensus in the blockchain respectively.

S209: The consensus node A to the consensus node D respectively determine whether at least 2 f+1 valid signatures are received. If yes, proceed to S210.

It is assumed that a maximum quantity of abnormal nodes permitted in the blockchain is 1, that is, f=1. If the consensus node A to the consensus node D respectively determine that at least three valid signatures are received, S210 may be performed.

The consensus node A to the consensus node D may respectively perform a signature verification operation on the at least three received signatures, that is, decrypt the at least three received signatures to obtain at least three Merkle roots, compare the at least three Merkle roots to the Merkle root calculated by the node, and if the at least three Merkle roots are the same as the calculated Merkle root, determine that the at least three signatures are valid.

S210: The consensus node A to the consensus node D respectively generate, based on the at least 2 f+1 valid signatures, a proof of consensus and a new block recording all the proposals on which consensus is reached.

It is assumed that the consensus node A to the consensus node D respectively receive three valid signatures, the three valid signatures may be placed into a file to generate a proof of consensus for all the proposals on which consensus is reached, and generate a new block for recording all the proposals on which consensus is reached and the proof of consensus.

When a proof of consensus is generated for one or more proposals on which consensus is reached, a first consensus node in a blockchain can: obtain a Merkle root of the one or more proposals on which consensus is reached, where the one or more proposals on which consensus is reached are initiated by one or more consensus nodes in the blockchain; sign the Merkle root of the one or more proposals on which consensus is reached, to obtain a signature of the one or more proposals on which consensus is reached; and then transmit the signature of the one or more proposals on which consensus is reached to one or more consensus nodes in the blockchain. A second consensus node in the blockchain can receive the signature transmitted by the first consensus node, and if signatures transmitted by 2 f+1 first consensus nodes are received, the second consensus node generates, based on the received signatures, a proof of consensus for the one or more proposals on which consensus is reached, where f is a maximum quantity of abnormal consensus nodes permitted by the blockchain. In this way, after the second consensus node generates proofs of consensus for all proposals on which consensus is reached, the validity of a block recording all the proposals on which consensus is reached can be confirmed based on the proofs of consensus, thereby greatly improving the efficiency of proving the validity of the block.

Figure 3:
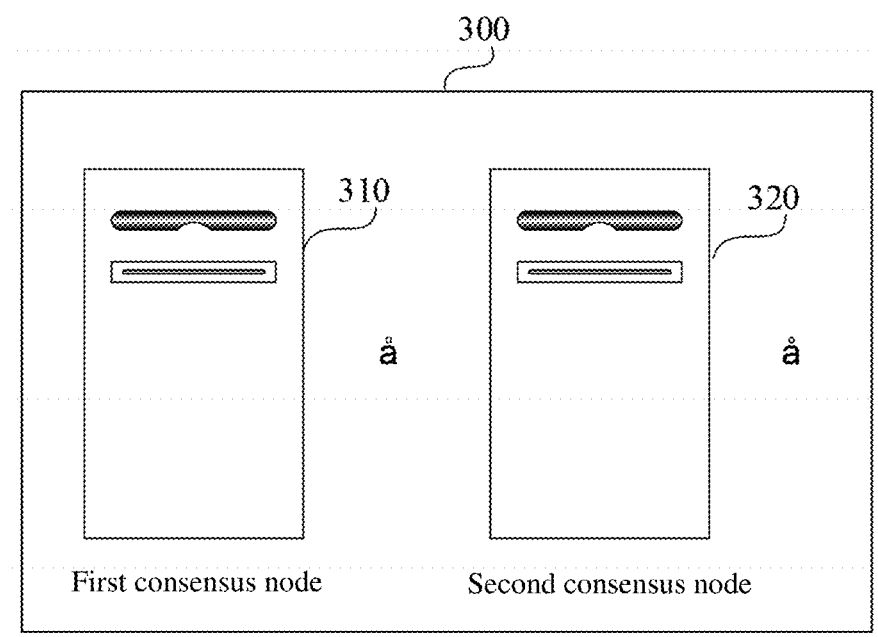
FIG. 3 is a schematic structural diagram of a blockchain system, according to an embodiment of this specification.

FIG. 3 is a schematic structural diagram of a blockchain system, according to an embodiment of this specification. Referring to FIG. 3, in a software implementation, the blockchain system 300 may include a first consensus node 310 and a second consensus node 320 in a blockchain.

The first consensus node 310 in the blockchain is configured to: obtain a Merkle root of one or more proposals on which consensus is reached, where the one or more proposals on which consensus is reached are initiated by one or more consensus nodes in the blockchain; sign the Merkle root of the one or more proposals on which consensus is reached, to obtain a signature of the one or more proposals on which consensus is reached; and transmit the signature of the one or more proposals on which consensus is reached to one or more consensus nodes in the blockchain.

The second consensus node 320 in the blockchain is configured to: receive the signature transmitted by the first consensus node; and if signatures transmitted by 2 f+1 first consensus nodes are received, generate, based on the received signatures, a proof of consensus for the one or more proposals on which consensus is reached, where f is a maximum quantity of abnormal consensus nodes permitted by the blockchain.

As can be known from the blockchain system shown in FIG. 3, when a proof of consensus is generated for one or more proposals on which consensus is reached, a first consensus node in a blockchain can obtain a Merkle root of the one or more proposals on which consensus is reached, where the one or more proposals on which consensus is reached are initiated by one or more consensus nodes in the blockchain; sign the Merkle root of the one or more proposals on which consensus is reached, to obtain a signature of the one or more proposals on which consensus is reached; and then transmit the signature of the one or more proposals on which consensus is reached to one or more consensus nodes in the blockchain. A second consensus node in the blockchain can receive the signature transmitted by the first consensus node, and if signatures transmitted by 2 f+1 first consensus nodes are received, the second consensus node generates, based on the received signatures, a proof of consensus for the one or more proposals on which consensus is reached, where f is a maximum quantity of abnormal consensus nodes permitted by the blockchain. In this way, after the second consensus node generates proofs of consensus of all proposals on which consensus is reached, the validity of a block recording all the proposals on which consensus is reached can be confirmed based on the proofs of consensus, thereby greatly improving the efficiency of proving the validity of the block.

In an embodiment, when the blockchain uses a consensus protocol of a Honey Badger BFT algorithm, there are a plurality of proposals on which consensus is reached, and the plurality of proposals are initiated by a plurality of consensus nodes in the blockchain.

The obtaining a Merkle root of one or more proposal on which consensus is reached includes:

generating a Merkle tree based on the plurality of proposals on which consensus is reached; and obtaining a Merkle root of the plurality of proposals on which consensus is reached.

In an embodiment, the first consensus node 310 is configured to:

obtain a sequence of the plurality of consensus nodes initiating the plurality of proposals on which consensus is reached;

sequentially obtain, according to the sequence of the plurality of consensus nodes, transactions included in the plurality of proposals on which consensus is reached; and generate the Merkle tree based on the sequence of the plurality of consensus nodes and the transactions included in the plurality of proposals on which consensus is reached.

In an embodiment, the second consensus node 320 is configured to:

verify the received signatures if the signatures transmitted by the 2 f+1 first consensus nodes are received; and if the received signatures are verified, generate, based on the received signatures, the proof of consensus for the one or more proposals on which consensus is reached.

In an embodiment, after generating, based on the received signatures, the proof of consensus for the one or more proposals on which consensus is reached, the second consensus node 320 is further configured to:

obtain a transaction set based on transactions included in the one or more proposals on which consensus is reached; and generate a new block recording the transaction set.

In an embodiment, before obtaining the Merkle root of the one or more proposals on which consensus is reached, a first consensus node 310 in the blockchain is further configured to:

split a proposal on which consensus is pending into a plurality of data blocks through erasure coding, where a quantity of the plurality of data blocks is the same as a quantity of consensus nodes in the blockchain;

construct a Merkle tree based on hash values of the plurality of data blocks, to obtain a corresponding Merkle path and a corresponding root hash;

store some of data blocks of the plurality of data blocks locally, and transmit other data blocks of the plurality of data blocks, Merkle proofs of the other data blocks on the Merkle path, and the root hash to other consensus nodes in the blockchain, for the other consensus nodes in the blockchain to perform consensus processing and feedback on the received data blocks; and receive a plurality of proposals on which consensus is pending that are initiated by the other consensus nodes in the blockchain, and perform consensus processing and feedback respectively on the plurality of proposals on which consensus is pending.

In an embodiment, the first consensus node 310 in the blockchain is configured to:

perform, based on a binary agreement (BA) sub-protocol in the Honey Badger BFT consensus algorithm, consensus processing and feedback respectively on the plurality of proposals on which consensus is pending.

In an embodiment, the second consensus node 320 is configured to:

perform signature verification on the received signatures based on a locally stored Merkle root of the one or more proposals on which consensus is reached.

In an embodiment, when the blockchain uses a consensus protocol of a BFT algorithm, the one or more proposals on which consensus is reached are initiated by a consensus master node in the blockchain, and the quantity of the one or more proposals on which consensus is reached is 1.

In an embodiment, before receiving the signature transmitted by the first consensus node, the second consensus node 320 in the blockchain is further configured to:

obtain a Merkle root of one or more proposals on which consensus is reached, where the one or more proposals on which consensus is reached are initiated by one or more consensus nodes in the blockchain;

sign the Merkle root of the one or more proposals on which consensus is reached, to obtain a signature of the one or more proposals on which consensus is reached; and transmit the signature of the one or more proposals on which consensus is reached to one or more consensus nodes in the blockchain.

The blockchain system 300 can implement the method of the method embodiments of FIG. 1 and FIG. 2. Details may be referred to the method for consensus in a blockchain in the embodiments shown in FIG. 1 and FIG. 2, and are not described herein again.

In summary, the foregoing descriptions are merely some embodiments of this specification and do not limit the protection scope of this specification. Any modification, equivalent replacement, and improvement made within the spirit and principle of one or more embodiments of this specification shall fall within the protection scope of the one or more embodiments of this specification.

The system, the apparatus, the module, or the unit described in the foregoing embodiments may be specifically implemented by a computer chip or an entity, or implemented by a product having a certain function. A typical implementation device is a computer. The computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition herein, the computer-readable medium does not include transitory computer-readable media (transitory media), such as a modulated data signal and a carrier.

The terms "comprise," "include," or any variants thereof cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A method comprising:
    obtaining a sequence of a plurality of nodes associated with a blockchain that initiate a plurality of proposals;
    sequentially obtaining, according to the sequence of the plurality of nodes, transactions included in the plurality of proposals;
    generating a Merkle tree based on the sequence of the plurality of nodes and the transactions included in the plurality of proposals;
    obtaining a Merkle root of the proposals based on the generated Merkle tree;
    signing the Merkle root of the proposals to obtain a digital signature of the proposals;
    transmitting the digital signature of the proposals to one or more nodes associated with the blockchain;
    receiving a plurality of digital signatures of the proposals from one or more nodes associated with the blockchain respectively;
    determining that a quantity of the received digital signatures is at least 2 f+1, wherein f is a maximum quantity of abnormal nodes permitted by the blockchain;
    verifying the received digital signatures;
    generating a proof of consensus for the proposals based on the verified digital signatures;
    obtaining a transaction set based on the transactions included in the proposals; and
    generating a new block recording the transaction set.

2. The method of claim 1, wherein before obtaining the Merkle root of the proposals, the method further comprises:
    splitting a proposal on which consensus is pending into a plurality of data blocks through erasure coding, wherein a quantity of the plurality of data blocks is the same as a quantity of nodes associated with the blockchain;

constructing a Merkle tree based on hash values of the plurality of data blocks, to obtain a corresponding Merkle path and a corresponding root hash;

storing one or more data blocks of the plurality of data blocks locally, and transmitting, to a plurality of nodes associated with the blockchain, the other data blocks of the plurality of data blocks, Merkle proofs of the other data blocks on the Merkle path, and the root hash, for the plurality of nodes in the blockchain to perform consensus processing and feedback on the transmitted data blocks; and receiving a plurality of proposals on which consensus is pending that are initiated by one or more of the plurality of nodes associated with the blockchain, and performing consensus processing and feedback respectively on the plurality of proposals on which consensus is pending.

3. The method of claim 2, wherein the performing consensus processing and feedback respectively on the plurality of proposals on which consensus is pending comprises:

performing, based on a binary agreement (BA) sub-protocol in a Honey Badger Byzantine fault tolerance (BFT) consensus algorithm, the consensus processing and feedback respectively on the plurality of proposals on which consensus is pending.

4. The method according to claim 1, wherein the verifying the received digital signatures comprises:

performing signature verification on the received digital signatures based on a locally stored Merkle root of the proposals.

5. The method of claim 1, wherein the blockchain uses a consensus protocol of a BFT algorithm, the proposals consist of one proposal, and the one proposal is initiated by a consensus master node associated with the blockchain.

6. A system, comprising one or more processors and a non-transitory computer-readable storage medium storing instructions executable by the one or more processors to cause the system to perform operations comprising:

obtaining a sequence of a plurality of nodes associated with a blockchain that initiate a plurality of proposals;

sequentially obtaining, according to the sequence of the plurality of nodes, transactions included in the plurality of proposals;

generating a Merkle tree based on the sequence of the plurality of nodes and the transactions included in the plurality of proposals;

obtaining a Merkle root of the proposals based on the generated Merkle tree;

signing the Merkle root of the proposals to obtain a digital signature of the proposals;

transmitting the digital signature of the proposals to one or more nodes associated with the blockchain;

receiving a plurality of digital signatures of the proposals from one or more nodes associated with the blockchain respectively;

determining that a quantity of the received digital signatures is at least 2 f+1, wherein f is a maximum quantity of abnormal nodes permitted by the blockchain;

verifying the received digital signatures;

generating a proof of consensus for the proposals based on the verified digital signatures;

obtaining a transaction set based on the transactions included in the proposals; and generating a new block recording the transaction set.

7. The system of claim 6, wherein the verifying the received digital signatures comprises:

performing signature verification on the received digital signatures based on a locally stored Merkle root of the proposals.

8. The system of claim 6, wherein before obtaining a Merkle root of the proposals, the method further comprises:

splitting a proposal on which consensus is pending into a plurality of data blocks through erasure coding, wherein a quantity of the plurality of data blocks is the same as a quantity of nodes associated with the blockchain;

constructing a Merkle tree based on hash values of the plurality of data blocks, to obtain a corresponding Merkle path and a corresponding root hash;

storing one or more data blocks of the plurality of data blocks locally, and transmitting, to a plurality of nodes associated with the blockchain, the other data blocks of the plurality of data blocks, Merkle proofs of the other data blocks on the Merkle path, and the root hash, for the plurality of nodes in the blockchain to perform consensus processing and feedback on the transmitted data blocks; and receiving a plurality of proposals on which consensus is pending that are initiated by one or more of the plurality of nodes associated with the blockchain, and performing consensus processing and feedback respectively on the plurality of proposals on which consensus is pending.

9. The system of claim 8, wherein the performing consensus processing and feedback respectively on the plurality of proposals on which consensus is pending comprises:

performing, based on a binary agreement (BA) sub-protocol in a Honey Badger Byzantine fault tolerance (BFT) consensus algorithm, the consensus processing and feedback respectively on the plurality of proposals on which consensus is pending.

10. The system of claim 6, wherein the blockchain uses a consensus protocol of a Honey Badger Byzantine fault tolerance (BFT) algorithm, the proposals consist of one proposal, and the one proposal is initiated by a consensus master node associated with the blockchain.

11. A non-transitory computer-readable storage medium, configured with instructions executable by one or more processors to cause the one or more processors to perform operations comprising:

splitting a proposal on which consensus is pending into a plurality of data blocks through erasure coding, wherein a quantity of the plurality of data blocks is the same as a quantity of nodes associated with a blockchain;

constructing a Merkle tree based on hash values of the plurality of data blocks, to obtain a corresponding Merkle path and a corresponding root hash;

storing one or more data blocks of the plurality of data blocks locally, and transmitting, to a plurality of nodes associated with the blockchain, the other data blocks of the plurality of data blocks, Merkle proofs of the other data blocks on the Merkle path, and the root hash, for the plurality of nodes in the blockchain to perform consensus processing and feedback on the transmitted data blocks;

receiving one or more proposals on which consensus is pending that are initiated by one or more of the plurality of nodes associated with the blockchain;

obtaining a Merkle root of the one or more proposals;

signing the Merkle root of the one or more proposals to obtain a digital signature of the one or more proposals;

transmitting the digital signature of the one or more proposals to the one or more nodes associated with the blockchain;

receiving one or more digital signatures of the one or more proposals from the one or more nodes associated with the blockchain respectively;

determining that a quantity of the received one or more digital signatures is at least 2 f+1, wherein f is a maximum quantity of abnormal nodes permitted by the blockchain; and generating a proof of consensus for the one or more proposals based on the received one or more digital signatures.

12. The non-transitory computer-readable storage medium of claim 11, wherein the one or more proposals comprise a plurality of proposals, and the obtaining a Merkle root of one or more proposals comprises:

generating a Merkle tree based on the plurality of proposals; and obtaining a Merkle root of the plurality of proposals based on the generated Merkle tree.

13. The non-transitory computer-readable storage medium of claim 12, wherein the generating a Merkle tree based on the plurality of proposals comprises:

obtaining a sequence of a plurality of nodes initiating the plurality of proposals;

sequentially obtaining, according to the sequence of the plurality of nodes, transactions included in the plurality of proposals; and generating the Merkle tree based on the sequence of the plurality of nodes and the transactions included in the plurality of proposals.

14. The non-transitory computer-readable storage medium of claim 11, wherein the generating a proof of consensus for the one or more proposals based on the received one or more digital signatures comprises:

verifying the received one or more digital signatures; and generating the proof of consensus for the one or more proposals based on the verified one or more digital signatures.

15. The non-transitory computer-readable storage medium of claim 14, wherein the verifying the received one or more digital signatures comprises:

performing signature verification on the received one or more digital signatures based on a locally stored Merkle root of the one or more proposals.

16. The non-transitory computer-readable storage medium of claim 14, wherein after generating the proof of consensus for the one or more proposals, the operations further comprise:

obtaining a transaction set based on transactions included in the one or more proposals; and generating a new block recording the transaction set.

17. The non-transitory computer-readable storage medium of claim 11, wherein the blockchain uses a consensus protocol of a Honey Badger Byzantine fault tolerance (BFT) algorithm, the proposals consist of one proposal, and the one proposal is initiated by a consensus master node associated with the blockchain.

* * * * *